June 22, 1926.   1,589,715
P. R. OWENS
TEMPERATURE REGULATOR
Filed Jan. 15, 1921
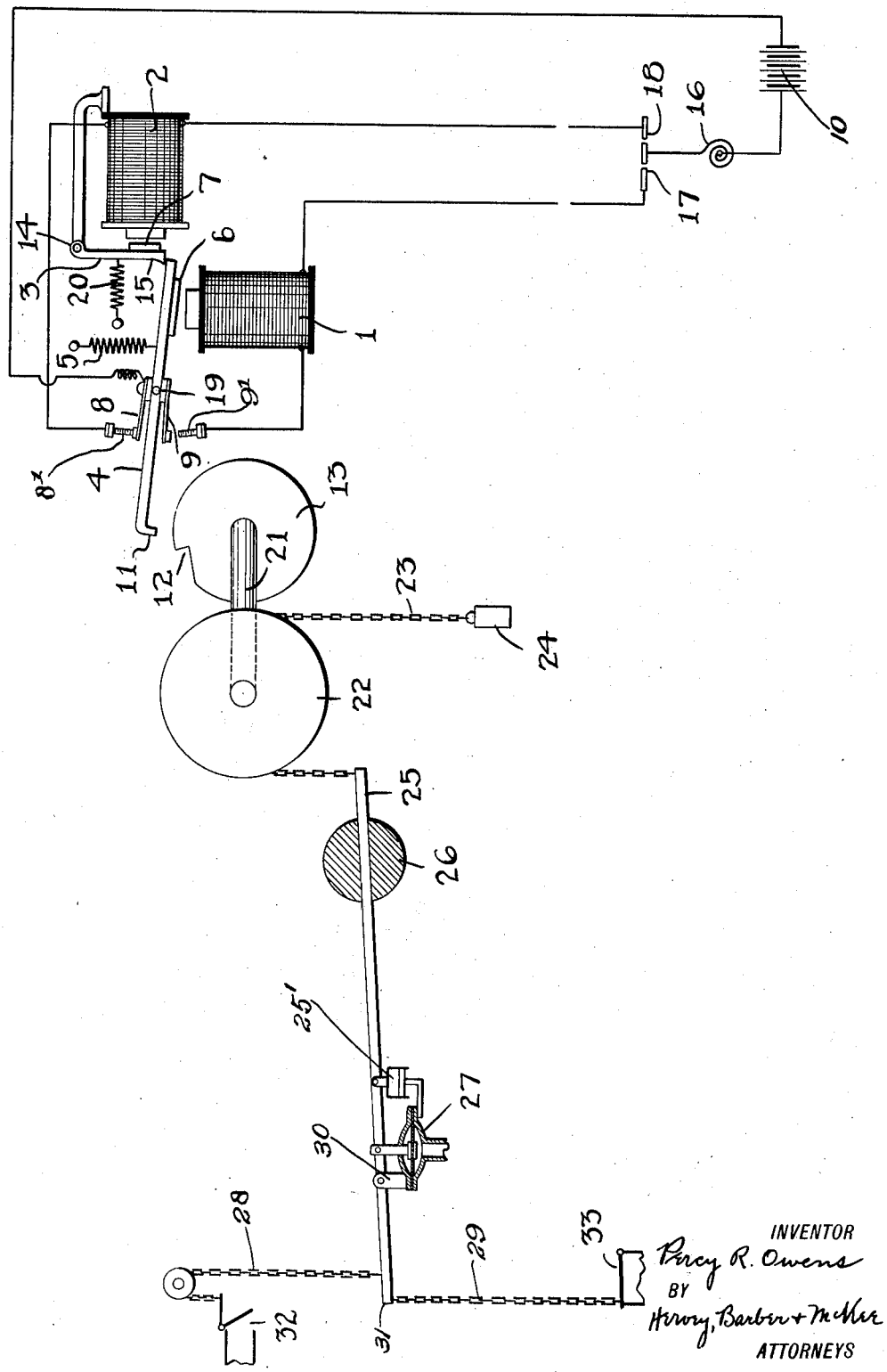
INVENTOR
Percy R. Owens
BY
Hervey, Barber + McKee
ATTORNEYS Patented June 22, 1926.

1,589,715

UNITED STATES PATENT OFFICE.

PERCY R. OWENS, OF MOUNT KISCO, NEW YORK.

TEMPERATURE REGULATOR.

Application filed January 15, 1921. Serial No. 437,625.

The invention relates to improvements in temperature regulators and particularly to thermostatically controlled devices for controlling the operation of heat-controlling means such as dampers in a heating plant in accordance with the temperatures desired at the point where the thermostat is situated.

In the thermostatic regulators for controlling the draft of domestic heating furnaces and the like, as now on the market, with which I am familiar, the dampers or heat-controlling members are all operated by some form of motor which is part of the temperature controlling equipment. Thus electric motors, spring motors, etc., are commonly used. In accordance with the present invention I am enabled to do away with the necessity for employing any separate motive device.

I accomplish this by utilizing the power within the steam or other heating medium employed in the system. A weighted lever is ordinarily mounted on a domestic heating furnace, one end of the lever being connected to a damper, or draft controlling device. The lever is acted upon by a diaphragm or similar device which is expanded or contracted in accordance with variations of condition within the heating medium. That is to say, in a steam heating unit a rise of pressure in the boiler of the heating unit causes the diaphragm member to expand or rise and lift one end of the lever so as to operate draft controlling means to reduce the draft.

The pivoted lever, referred to, when properly balanced thus rises and falls at intervals in accordance with variation of steam pressure in the boiler (in the case of a steam heating system) with corresponding automatic regulation, to a certain extent, of the furnace. Such regulation, however, is not likely to maintain the temperature at a uniform desired point in the rooms or spaces heated by the system. In my present invention I utilize the movement of the lever, to provide the power for operating the dampers or heat-controlling members and control the movement of the lever to a certain extent by thermostatic means. When the lever has been raised, by the increase of pressure in the boiler, for example, I may cause a detent means to hold the lever in its raised position, if the temperature at the place where the thermostat is situated is greater than the predetermined amount. The draft will, accordingly, be checked. When the temperature to be regulated drops below the predetermined point, the pivoted lever is released.

In order that the invention may be more fully understood attention is hereby directed to the accompanying drawing, the same illustrating diagrammatically an apparatus comprising one form of my invention. Referring to the drawings:

Over pulley wheel 22, is conducted chain 23 bearing at one end weight 24. The other end of chain 23 is secured to governing lever 25 to which is attached movable weight 26, which is heavier than weight 24. Lever 25 is pivoted at 30 and is raised by the action of the diaphragm or pressure responsive device, 27, which is connected to the steam space of the boiler, when sufficient pressure generated by heat is present, and in this way raises weight 26. End 31 of lever 25 is thereby depressed, causing a corresponding action of chains 28 and 29 which regulate the positions of check draft damper 32 and damper 33, opening the former in the pipe and closing the latter, at the point of draft under the fire. When the pressure is diminished, because of the consequent cooling of the fire, weight 26 through force of gravity gradually falls, raising weight 24 and also end 31 of lever 25 and imparts a contrary action to chains 28 and 29, whereby damper 32 is closed and damper 33 is opened. A weighted governing lever operating mechanically as above described will maintain a more or less even degree of combustion in the furnace and a more or less constant pressure at diaphragm 27, but it is without any means of control, whereby the limits of temperature within which it operates can be varied. I have shown a dash-pot $25^1$ mounted in position to prevent the weighted end of the lever from descending too rapidly.

Such damper controlling means, as above described, are commonly used, both in connection with steam heating and hot water heating equipment. In the case of a hot water equipment the diaphragm 27 or its equivalent is raised or lowered in accordance with the temperature of the water. This may be accomplished, for example, by the provision of a chamber containing a volatile liquid which is caused to expand and raise the diaphragm when the heat of the water increases and to permit the contraction of the diaphragm when the heat of the water diminishes.

As stated, in accordance with my invention I may hold the weighted end of lever 25 in raised position, when this end of the lever has been thus raised by the expansion of diaphragm 27, so long as the temperature of a room heated by the system is higher than a predetermined point. It is obvious that various forms of mechanism may be utilized for accomplishing the function indicated.

Specifically describing the invention; numbers 1 and 2 are electro magnets and number 3 is a lever, jointed at the point 14, so that the vertical portion 15 moves upon the pivot 14, in response to the power applied thereto, and engages and holds in position lever 4, as shown in the drawing. Number 4 is a horizontal lever, pivoted at the point 19, and having at the end a projection 11, intended to engage the slot 12, in disc 13 which is fixedly mounted on shaft 21 on which pulley 22 is also fast. The vertical portion of lever 3 is retracted by spring 20 and lever 4 is retracted by spring 5. To lever 4 at its extremity and opposite electro magnet 1 is attached armature 6. At the extremity 15 of lever 3 and opposite electro magnet 2 is attached armature 7.

The operation of lever 4 is controlled by electric magnets 1 and 2, circuits of which are controlled by a thermostat 16. This latter is situated in any room or space, the temperature of which is to be maintained at or about the point for which the thermostat is set.

The thermostat is shown in the position occupied when the room is at the desired temperature. When the temperature falls below this point the thermostat spring moves into engagement with a contact 17 and when the temperature of the room rises beyond the predetermined point the spring will move in the opposite direction into engagement with contact 18.

In the condition of the system illustrated in the drawing, the temperature being normal at the point where the thermostat is situated, electro magnets 1 and 2 will both be disconnected from the battery or other electrical source, 10. Detent lever 4 is shown in its inoperative position in which it is held by the foot 15 of armature carrying arm 3. Accordingly, lever 25 is free to rise and fall in accordance with the movement of diaphragm 27.

If, now, the temperature at the thermostat rises beyond the predetermined point, thermostat 16 will move into engagement with contact 18 so that electro magnet 2 will be energized by a circuit extending from the battery through the thermostat and contact 18 and through electro magnet 2. The current then flows through a contact $8^1$ and a spring contact 8 carried by lever 4, which engages contact $8^1$ in the position of the parts shown. Current flows from spring contact 8 back to the battery, energizing electro magnet 2 and moving armature 7 to the right against the force of spring 20.

This movement of armature 7 and arm 3 carrying the same releases the tail of detent lever 4 from the foot of arm 3 and spring 5 swings lever 4 about its pivot so as to cause the detent 11 at the end of lever 4 to swing down against disc 13. This movement of lever 4 also causes spring contact 9 carried by lever 4 to engage against a contact $9^1$, which is connected to electro magnet, 1. Because of this movement, also, the circuit of electro magnet 2 is broken at contacts 8, $8^1$.

If, now, the right-hand end of lever 25 is in a raised position, the end 11 of lever 4 will engage notch 12 of disc 13, because pulley 22 and detent wheel 13, on shaft 21, are rotated by chain 23 and weight 24, when lever 25 rises, to bring notch 12 into position to be engaged by the end 11 of lever 4. If the right-hand end of lever 25 is not raised at this time, the end 11 of lever 4 will rest on the surface of disc 13 in position to drop into notch 12, as soon as the right-hand end of lever 25 is raised. The lever 25 will thus be raised shortly in any case, since the fact that the temperature is too high at the point where the thermostat is located indicates a hot fire in the furnace, and that steam pressure accordingly will raise diaphragm 27.

Detent 11 having engaged notch 12, the right-hand end of lever 25 will be held raised regardless of any increase or decrease of steam pressure acting on diaphragm 27. Accordingly, damper 33 will be held closed and the check draft 32 held open until the fire has been checked. When, accordingly the temperature at the thermostat drops below the predetermined point the thermostat will move out of engagement with contact 18. No arc will be formed at contact 18, since circuit of electro magnet 2 has previously been broken at contacts 8, $8^1$.

The thermostat moves on into engagement with the low temperature contact 17. Electro magnet 1 is accordingly energized by a circuit extending through contacts $9^1$ and 9. The armature 6 of electro magnet 1 is accordingly attracted by the magnet causing the right-hand end of lever 4 to be depressed and the left-hand end of the same to be raised, so as to dis-engage detent 11 from notch 12.

As the right-hand end of lever 4 is depressed into the position shown in the drawing, the lower end 15 of arm 3 will be swung by spring 20 into position above the tail of lever 4, so as to latch lever 4 in its inoperative position. The circuit of electro magnet 1 is broken at contacts 9, $9^1$, as soon as the tail of lever 4 engages beneath end 15 of arm 3, as described. The right-hand end of lever 25 is now free to drop provided that pressure on diaphragm 27 does not hold it up. As soon as decrease of pressure on the diaphragm permits such action weight 26 will cause the right-hand end of lever 25 to descend and the opposite end of the lever to rise, so as to increase the draft of the furnace and accordingly build up the fire again.

It should be understood that the invention is not limited to the details of construction which have been particularly described, the same being illustrative merely.

The device may also be used in connection with any heating plant where sufficient pressure can be created to raise the governing beam as above described. Such a pressure is present in some forms of hot water heaters, in which a chamber containing volatile liquid, conditioned to expand at certain low temperatures, is employed.

I am aware that prior to my invention, temperature regulators have been made controlled by thermostats, operating by means of clockwork, spring or other motors. I, therefore, do not claim such a combination broadly; but,

I claim:

1. In a temperature regulator, the combination with a pivoted lever of a heating unit, connections therefrom to heat-controlling means for said unit, and means for raising and lowering said lever, responsive to pressure or temperature variations of the heating medium in said unit, of a thermostat at a desired point, and means controlled thereby for holding an end of said lever in raised position, only after the same has been raised by said pressure or temperature responsive means in case the temperature controlling said thermostat rises beyond a predetermined point, and for releasing said lever when the temperature controlling said thermostat falls below the predetermined point.

2. In a temperate regulator, the combination with a pivoted lever of a heating unit, connections therefrom to heat-controlling means for said unit, and a member adapted to rise or fall in accordance with varying conditions within the heating medium in said unit, for raising said lever or permitting the same to descend, of a thermostat at a place the temperature of which is to be controlled and means, controlled thereby, for securing the end of said lever in raised position, only when the same is raised to such position by said member, if the temperature at said place rises beyond a predetermined point, and for releasing said lever when the temperature at said place falls below the predetermined point.

3. In a temperature regulator, the combination with a pivoted lever of a heating unit, connections therefrom to heat controlling means for the heating unit, and a member adapted to rise or fall in accordance with varying conditions within the heating medium in said unit, for raising said lever or permitting the same to descend, of detent means for holding the end of said lever in raised position when it is raised by said member to such position, means for actuating said detent means, means for releasing said detent means, a thermostat, and means controlled thereby for rendering said actuating means, or said releasing means, operative.

4. In a temperature regulator, the combination with a pivoted heat-controlling lever of a heating unit, which lever is automatically raised and lowered only by an expansible member movable in accordance with varying conditions of the heating medium in the heating unit, of devices adapted to coact with said lever, said devices comprising a thermostatic member and holding means controlled thereby for detaining the pivoted lever in one position, when the temperature at the thermostatic member is at one side of a predetermined point, and for releasing the pivoted lever when the temperature at the thermostat changes to the other side of the predetermined point.

5. In a temperature regulator, the combination with a pivoted lever, connections therefrom to a furnace heat-controlling member, and an expansible member adapted to rise or fall in accordance with steam pressure in the boiler heated by the furnace, for raising said lever or permitting it to descend, of a thermostat and detent means controlled thereby for detaining the pivoted lever in one position, when the temperature at the thermostatic member is at one side of a predetermined point, and for releasing the pivoted lever when the temperature at the thermostat changes to the other side of the predetermined point.

6. In a temperature regulator, the combination with a pivoted lever of a heating unit, connections therefrom to a heat-controlling member for said unit, and a member adapted to rise or fall in accordance with varying conditions within the heating medium in said unit, for raising said lever or permitting the same to descend, of a movable member having an abutment thereon, connections therefrom to said lever to cause the movement thereof in one direction or the other as said lever rises or falls, a detent adapted to coact with said member and to engage said abutment when said lever rises, and means at a distance for causing said detent to engage with or disengage from said member.

PERCY R. OWENS.